Sept. 16, 1958    J. SMISKO ET AL    2,852,282
FLEXIBLE FLUID SEALED JOINT FOR RIGID TUBES
Filed July 16, 1951    3 Sheets-Sheet 3
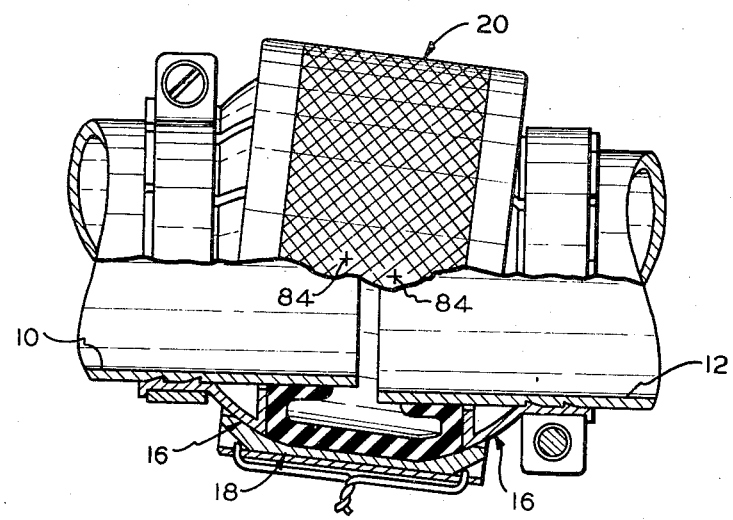
FIG. XI.
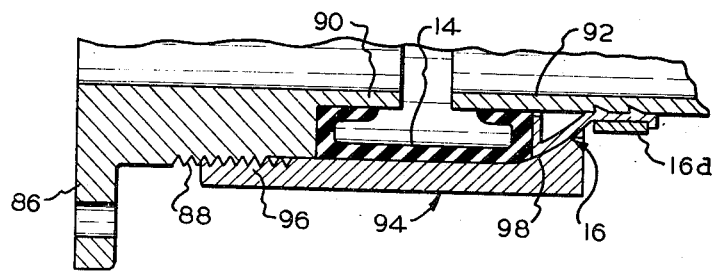
FIG. XII.
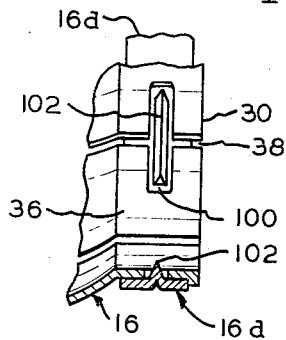
FIG. XIII.
INVENTORS
ROGER R. LAMARRE AND
JOHN SMISKO
BY
ATTORNEY

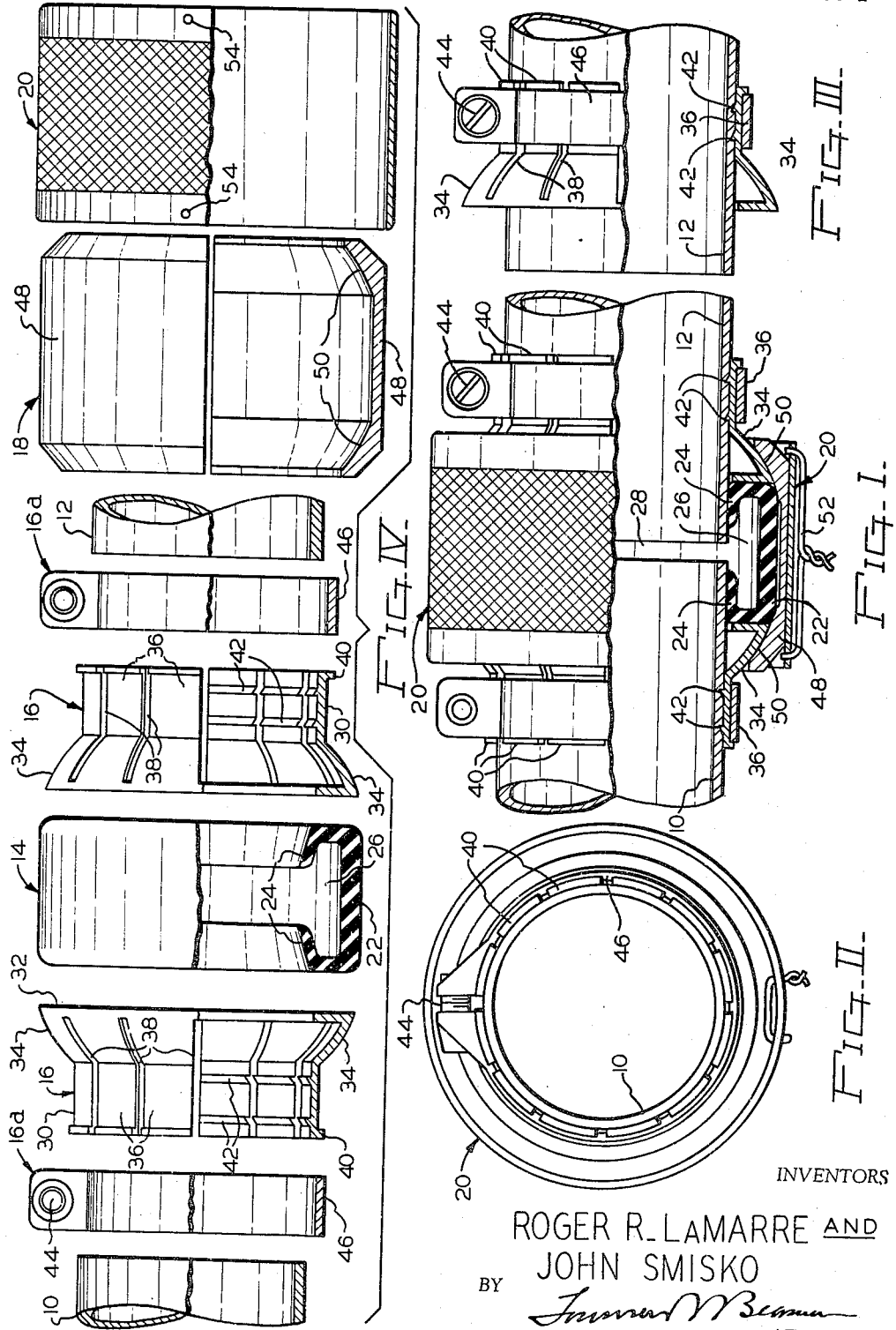

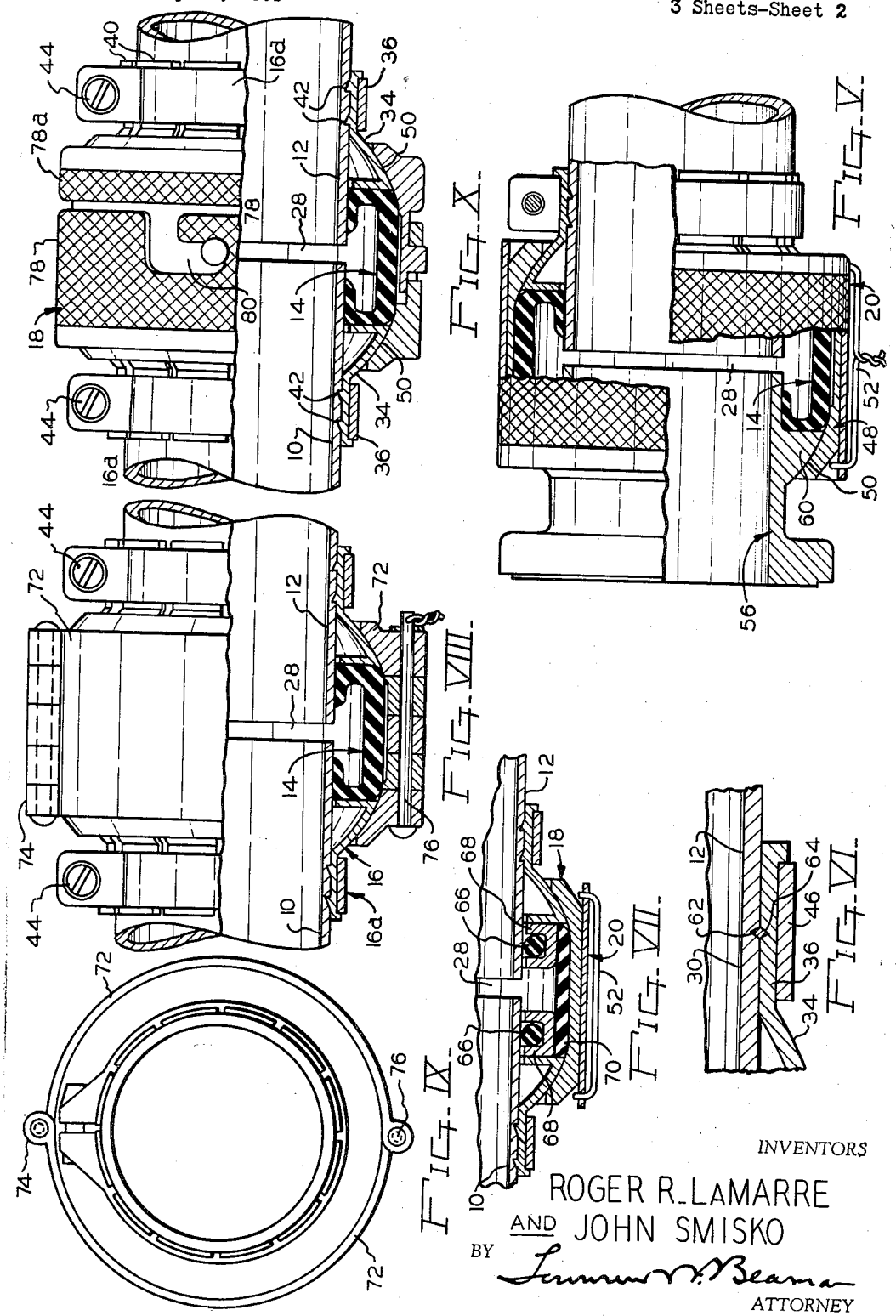

United States Patent Office 2,852,282
Patented Sept. 16, 1958

2,852,282

FLEXIBLE FLUID SEALED JOINT FOR RIGID TUBES

John Smisko and Roger R. La Marre, Jackson, Mich., assignors to Aeroquip Corporation, Jackson, Mich., a corporation of Michigan Application July 16, 1951, Serial No. 236,962

3 Claims. (Cl. 285—112)

This invention relates to fluid sealed flexible joints for connecting the ends of rigid tubes to one another, or to adjacent structures, such as flanged or screwed socket heads, and in particular to flexible fluid sealed joints which, while maintaining an effective fluid tight seal within the connected parts, are able to withstand and accommodate vibration and torsional motion developed in an associated tube assembly subjected to high internal fluid pressure, or produced externally thereof, and which joint will effectively hold the tube assembly against a tendency for axial separation.

There have been many proposals for flexible fluid sealed joint connectors for rigid tubing subjected to internal or external influences, such as above stated, including proposals which involve pre-forming the tubes, as by forming beadings or grooves thereon to form anchorages for the joint parts, and proposals which involve the exercise of relatively great manual effort and space, and the use of special tools, in which to actuate the joint parts to assemble or disassemble the same.

It is a requirement of many installations employing jointed tubing, as in airplanes and other locations employing rigid tubing for conveying high pressure fluid, that the joint should be capable of being readily and quickly made or taken apart in situ, which requirement is not fulfilled if it becomes necessary to pre-form the tube ends or to rely upon the exercise of relatively great manual effort, requiring the use of special tools, to make or dismantle the required joints.

It is thus an object of this invention to provide a flexible fluid sealed joint which can be readily and rapidly assembled or dismantled with the exercise of the minimum amount of manual effort and with the use of simple tools, such as a small pocket wrench or screw driver.

It is also an object of this invention to provide a flexible fluid sealed joint which is capable of being readily and quickly applied to a tube assembly or dismantled without there being any necessity to form the tube to receive the joint parts.

These and other objects and advantages of the invention, residing in the construction, arrangement and combination of parts, will be more fully disclosed, and will be appreciated by those skilled in the art, from a consideration of the following description and the appended claims.

In the drawings, where several forms of the invention are illustrated;

Fig. I is a side view, partly in section and partly in elevation, of a joint assembly according to one form of the invention, Fig. II is a view looking on the left-hand end of Fig. I, with a section taken through the associated tubing, Fig. III is a view of the right-hand portion of Fig. I, with parts of the coupling removed and showing the combination gripping and locating joint member, with its spherical bearing surface, applied to the right-hand tube section, Fig. IV is an exploded half plan and half elevation view of the joint parts according to Fig. I, Fig. V is a fragmentary section showing the invention applied to a flanged head fitting, Fig. VI is a detail view, showing an alternative form of compression gripping means for axially locating the joint upon a tube section and employing a separate hardened locking ring, Fig. VII is a detail view showing an alternative fluid sealing assembly for use in the joint according to the invention, Fig. VIII is a view similar to Fig. I, but of a modified joint construction and assembly, Fig. IX is an end view of Fig. VIII, with a section taken through the left-hand tube section, Fig. X is a view similar to Fig. VIII, but of yet another form of the invention, Fig. XI is a view similar to Fig. I but of an alternative assembly of the spherical surface members on the tube ends, which permits the tubes to be displaced laterally as well as to partake of angular displacement, Fig. XII is a half section of a further form of the invention, and Fig. XIII is a fragmentary detail view of a modified tube gripping means.

Referring to the drawings wherein like parts have been given the same reference numerals and first to Figs. I to IV, 10 and 12 indicate the end portions of rigid tube sections which are held together in axial fluid flow alignment by a fluid seal joint connector assembly comprising a fluid sealing ring 14, combined locating and gripping means 16, 16a, connector sleeve means 18 and retaining sleeve means 20, these joint connector parts being indicated generally by said reference numerals.

The fluid sealing ring 14 is shown as being of hollow channel section, with a closed outside peripheral wall 22 and an inside peripheral wall defined by ring flanges 24, which are spaced apart axially and open the interior 26 of the sealing ring to the interior of the connected tubes 10, 12, via the gap 28 (Fig. I) left between the two tubes upon assembly and connection of the joint. In the normal un-assembled condition, the flanges 24 are outwardly inclined, as seen in Fig. II, but on assembly, are stressed inwards towards the hollow interior of the sealing ring to make firm sealing contact with the surfaces of their respective tubes 10 and 12, the fluid seal being further enhanced, in the assembled condition, with pressure fluid conducted by the assembled tubes, due to the fact that the hollow interior 26 of the sealing ring is open to the fluid pressure via the gap 28 between the tubes. The sealing ring may be molded in one piece from rubber, or rubber-like material, as shown.

The combined locating and gripping means 16, 16a, in the example illustrated in these figures, are constituted by a pair of similar metal parts, fitted one on each of the tubes 10 and 12. Each said part, in an integral construction, provides a sleeve portion 30 and an end portion 32 which defines an outer annular spherical surface 34, with the sleeve portion defined by a series of relatively flexible fingers 36 separated from each other by axial slots 38, which are shown as extending into the said end portion 32. Also integrally formed with the sleeve portion 30 there is an external flange 40, at one end of the sleeve, and, on its interior surface, axially spaced knife-edge ribs 42, which extend in circular arrangement around the assembly of fingers 36. It is intended that whereas the tube sections may be of aluminum, the said parts 16 are of a harder metal, such as steel, whereby the knife-edge ribs 42 (which may be omitted at places to give a staggered effect) may be caused to penetrate or bite into the respective tube surfaces upon pressure being applied to the sleeve portions 30 to compress the fingers 36 and thus contract the sleeve portions. Such compression is capable of being effected and localized by the simple actuation of a screw stud 44 connecting the ends of a split-clamping ring 46 (constituting the part 16a) fitted over each sleeve portion 30 and retained between the flange 40 and the spherical surfaced end portion 34. The screw studs 44 may be in the form of socket head screws, as shown, for actuation by a simple pocket socket wrench.

The connector sleeve means 18, in the example illustrated in Figs. I to IV is of sleeve formation and is composed of separate halves 48 having their end portions formed, interiorly, with spherical mating surfaces 50 for the aforesaid spherical surfaces 34.

The retaining sleeve means 20 consists of a sleeve, as shown, which is formed to have a close sliding fit over the assembled connector sleeve parts 48 to enclose the latter, which sleeve 20 may be held secured against displacement by a wire connection 52 secured between the holes 54 in the sleeve ends.

The joint as thus described and illustrated in Figs. I to IV is easy to apply and service and may be made and serviced with relatively little manual effort and by the mere use of a small socket wrench or tool to actuate the screw studs 44, there being no need to pre-form the tubes for the retention and location of the combined locating and gripping parts 16, 16a, or to resort to the use of relatively great force or manual effort to effect the desired securing of the joint parts in position.

To assemble the joint it is merely necessary to slide the parts 16 onto the sleeve ends to define end portions of the tubes which, in relation to the axial extent of the sealing ring 14, will result in the gap 28 being left between the tube ends upon the thus defined tube ends being introduced into the opposite ends of the sealing ring 14 to position the end portions 32 of the parts 16 against the adjacent ends of the sealing ring, as seen in Fig. I. The construction and arrangement is such that the extent of this gap 28 can be arbitrarily chosen and may vary within limits, and need not be fixed, it being merely required that the actual gap should be sufficient to permit the joint parts 16 and 18 to partake of relative angular deflection by the hinge-like connection provided by the mutually presented spherical bearing surfaces 34 and 50. Such permitted angular deflection may be in the order of 5° and is sufficient to accommodate mis-aligning movements of the tube sections encountered in practice and thus provide a flexible yet sealed joint. With the parts 16 slid into position upon the tube ends it is merely necessary to tighten the rings 46, by actuation of the screw studs 44. This causes the fingers 36 to be contracted upon the respective tubes and, in turn, causes the knife-edge ribs 42 to bite into the material of the tubes and thus hold the assembled parts 16 against axial displacement with respect to their tube sections. The separate halves 48 of the connector sleeve 18 are next fitted over the assembled parts 16 and sealing ring 14 to enclose the latter and engage the spherical mating surfaces 34 and 50. Then the retaining sleeve 20 is slid over the assembled sleeve parts 18 and the wire connection 52 applied to lock this sleeve 20 against axial displacement.

The invention is shown in Figs. I to IV as applied to the connecting together of adjacent tube sections, such as may occur intermediate the ends of a fluid line constituted by separate tube sections. The invention may also be applied to the joining of the end of a tube section or line to a bulkhead or like structure. Such adaptation of the invention is shown in Fig. V where there is shown a flanged head fitting 56 pre-formed to have a spherical surfaced ring portion 60 integral therewith to take the place of one of the separately formed and mounting spherical surfaced parts 16 of the embodiment according to Figs. I to IV, and the head part take the place of one of the tube sections, being, for instance, the tube section 10. Otherwise the joint can be the same, for which reason parts thereof seen in Fig. V are given the same reference numerals.

Fig. VI shows a modified form of tube gripping means employing a separate diamond section split ring 62 in place of the integral knife-edge ribs 42. This ring, on assembly, is held located in a groove 64 in the end portion 30 of a said part 16, which latter may be of softer metal than the ring 62 and may be of aluminum, such as the tube section 12 seen in this figure. In such form of the invention the ribs 42 would be omitted from the end part 30 and compression of the fingers 36 by the tightening of the ring 46 be relied upon to cause the ring 62 to bite into the tube surface, as well as deeper into the fingers 36, if these are of softer metal.

While the sealing ring 14 of Figs. I to IV, in practice, will be formed to withstand both negative and positive fluid pressures (it being appreciated that the ring is open to the fluid pressure), positive assurance that such pressures would be withstood without fear of leakage at the sealed surfaces would be obtained with the use of a modified sealing ring assembly as shown in Fig. VII. In this form, the sealing ring is constituted by a pair of axially spaced sealing rings 66 retained in channel section rings 68 cemented onto a backing ring 70 of fluid sealing material, such as rubber.

Figs. VIII to X show modified forms of the invention which dispense with the necessity of employing the separate retaining sleeve 20 of the previous figures by forming the inside connector part 18 to be capable of being held self-locked. Thus in Figs. VIII and IX the connector part 18 is shown formed by separate semi-cylindrical parts 72 hinged together at 74 and held closed by the attachment of a retaining bolt 76, which can be readily removed to permit the parts 72 to be swung open about the hinge connection 74 when it is desired to remove or assemble the connector part 18, as will be well understood.

In Fig. X the connector part 18 is shown as constituted by two ring members 78, 78a, with the one ring member formed with a bayonet slot 80 and the other ring member provided with a pin 82 for releasable engagement in the slot 80 in the manner of a bayonet joint.

Since in Figs. VIII to X the joint parts and arrangement are otherwise the same as in the example according to Figs. I to IV the same references have been applied to indicate similar parts.

It will be seen that the construction of the connector joint is such that there is no need to remove the parts 16, 16a, in order to disconnect the coupled parts. This is an advantage, since it frequently happens that access is only required to the interior of the coupling and this in the case of Figs. I to VI merely necessitates removal of the outside sleeve 20 and interior two-part sleeve 48, whereas in the case of Figs. VIII to IX and X it is merely necessary to open the sleeve halves 72 or disconnect the bayonet joint 80, 82, respectively, leaving the part or parts 16, 16a, held upon the tube section or sections.

With regard to the spherical bearing surfaces of the disclosed joint construction these can be formed about a common center, which is centrally located with respect to the gap 28. In such form and arrangement the tube ends can partake of angular relative displacement but cannot be displaced laterally with respect to each other.

Fig. XI shows an arrangement which permits both lateral displacement and angular displacement of the tube ends. In this form of the invention the two spherical surface members 16 are secured upon the tube ends with their centers on different points, as on the points 84 axially spaced with respect to the tube axes. Whereas, with the common center arrangement of the previous figures it is possible to maintain the over-all length of the joint coupling within minimum limits, with the arrangement according to Fig. XI this length becomes longer and necessitates the use of a correspondingly lengthened connector sleeve 18.

In Fig. XII there is shown a form of the invention which may be employed to attach one end of a tube to a fixed socket fitting 86. Here the socket has an externally screw threaded portion 88 and a reduced cylindrical end portion 90 forming a seat for one of the inside flanges of the sealing ring 14 which also seats upon the end portion of the tube section 92 defined by the spherical surface member secured upon this tube section in the manner described with reference to the previous examples. The joint connector, however, is constituted by a sleeve 94 having a screw threaded end portion 96 and an internal spherical surface 98 which encloses the sealing member 14 and has mating engagement with the member 16 when the sleeve 94 is screwed upon the socket part 86.

Fig. XIII shows an alternative locking arrangement which dispenses with the knife-edge ribs 42 on the member 16. In this modified form the sleeve part 30 of the member 16, constituted by the fingers 36, besides having the axial slots 38, is also formed with circumferential slots 100 through which knife-edge ribs or teeth 102 on the clamping ring 16a are arranged to pass for penetrating into the material of the tube.

Having thus disclosed our invention what we claim as novel and wish to secure by Letters Patent is as follows:

1. Joint means for inter-connecting axially opposed ends of rigid fluid conductor pipes so that the pipes can have limited relative swinging motion at the joint yet remain sealed against leakage of the fluid and in which the opposed pipe ends have plain cylindrical exterior surfaces, said joint means comprising in combination, a pair of similar anchorage ring members each having an end portion with a part spherical exterior surface and an annular end wall and each said anchorage ring member having a split cylindrical sleeve portion axially slidable upon the cylindrical end surfaces of the pipes, adjustable clamp means for securing said sleeve portions in fixed adjusted position on said pipe surfaces, a connector sleeve having part spherical interior surfaces at its outer ends, said connector sleeve being composed of two parts capable of being fitted over said anchorage ring end portions to maintain the annular end walls on said anchorage ring end portions in pre-determined axially spaced relation outwardly from the ends of said pipes to provide free ends with the part spherical exterior surfaces on said anchorage ring end portions in mutual engagement with the interior part spherical surfaces on said connector ring to hold said pipes against relative axial displacement, separate fluid sealing ring structure of axial extent substantially corresponding to said pre-determined axial spaced relation, said sealing ring structure being generally C-shape in cross section and having free end portions and being slidable upon said pipes and having annular end walls for abutting engagement with the axially spaced annular end walls on said anchorage ring end portions and the free end portions of said sealing ring structure engaging the free ends of said pipe to provide a fluid pressure seal, and means associated with said connector sleeve to hold the parts of said sleeve in their said fitted position.

2. The invention as defined in claim 1, said sealing ring structure comprising a sleeve of rubber and a pair of axially spaced rigid ring members having internal grooves and rings of fluid sealing material therein, said ring members being secured upon the interior surface of said sleeve at opposite ends thereof.

3. The invention as claimed in claim 1, the external diameter of said sealing ring structure conforming substantially to the internal diameter of said connector sleeve.

References Cited in the file of this patent
UNITED STATES PATENTS

| | | |
|---|---|---|
| Re. 21,606 | Nielsen | Oct. 22, 1940 |
| 290,196 | Abel | Dec. 18, 1883 |
| 901,339 | Grant | Oct. 20, 1908 |
| 910,277 | Eliel | Jan. 19, 1909 |
| 1,382,840 | Levedahl | June 28, 1921 |
| 1,541,601 | Tribe | June 9, 1925 |
| 1,925,335 | Murphy | Sept. 5, 1933 |
| 2,014,313 | Damsel | Sept. 10, 1935 |
| 2,286,565 | Norton | June 16, 1942 |
| 2,318,006 | Mercier | May 4, 1943 |

FOREIGN PATENTS

| | | |
|---|---|---|
| 323,651 | Great Britain | Jan. 9, 1930 |